United States Patent [19]

Dierksmeier

[11] Patent Number: 4,838,584
[45] Date of Patent: Jun. 13, 1989

[54] QUICK DISCONNECT DUCT COUPLER

[75] Inventor: Douglas D. Dierksmeier, Palm Beach Gardens, Fla.

[73] Assignee: The United States of America as represented by the Secretary of the Air Force, Washington, D.C.

[21] Appl. No.: 100,385

[22] Filed: Sep. 24, 1987

[51] Int. Cl.⁴ .................................................. F16L 21/06
[52] U.S. Cl. ...................................... 285/419; 285/915
[58] Field of Search ............... 285/419, 373, 406, 915

[56] References Cited

U.S. PATENT DOCUMENTS

| | | | |
|---|---|---|---|
| 2,073,338 | 3/1937 | Durkee | 285/373 X |
| 2,317,729 | 4/1943 | Bruno | 285/180 |
| 2,403,839 | 7/1946 | Adolph | 285/419 X |
| 3,486,772 | 12/1969 | Elsner | 285/373 X |
| 3,625,549 | 12/1971 | De Vries | 285/373 X |
| 3,796,449 | 3/1974 | McLaughlin et al. | 285/405 |
| 4,074,914 | 2/1978 | Novotny | 285/405 |
| 4,185,472 | 1/1980 | Yates et al. | 64/1 S |
| 4,328,981 | 5/1982 | Greene, Jr. et al. | 285/286 |
| 4,558,892 | 12/1985 | Daw et al. | 285/424 X |
| 4,614,369 | 9/1986 | Orerath et al. | 285/373 X |

FOREIGN PATENT DOCUMENTS

| | | | |
|---|---|---|---|
| 470221 | 6/1914 | France | 285/373 |
| 183690 | 8/1922 | United Kingdom | 285/419 |

Primary Examiner—Thomas F. Callaghan
Attorney, Agent, or Firm—Robert L. Nathans; Donald J. Singer

[57] ABSTRACT

A coupling device utilizing first and second contiguous L-shaped coupling members affixed to terminal duct portions, and a slidable clamp having a T-shaped trough for gripping the L-shaped coupling members when slid thereover, locking them together to the close the duct. The clamp is slid away from the coupling members to rapidly open the duct.

1 Claim, 1 Drawing Sheet

QUICK DISCONNECT DUCT COUPLER

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of coupling devices having rapid connect/disconnect capabilities.

It is deemed desirable to provide for the rapid opening of cylindrical ducts surrounding turbo-jet aircraft engine components to provide access to such components for inspection and maintenance. Thus, a coupling device is needed which may be rapidly and easily opened to provide access to the interior engine components, and thereafter rapidly closed, all without the need for direct radial access to the coupling device.

SUMMARY OF THE INVENTION

It is an object of the present invention to provide a coupling device which does not change the outer contour of the ducts, which is light weight, provides good gas sealing capability, and maintains joint integrity at elevated temperatures.

It is a further object of the invention to provide such a coupling device which minimizes stress upon the terminal portions of the duct, made of fiber-reinforced composite material.

In accordance with a preferred embodiment, first and second L-shaped coupling members, bolted and cemented to first and second terminal duct portions, are aligned with each other parallel to the longitudinal duct axis, and an elongated clamp is slid over the coupling members to hold them together and lock them within the clamp consisting of a unitary bar having a T-shaped trough. The coupling device is thereafter rapidly opened by sliding the clamp bar away from the coupling members.

BRIEF DESCRIPTION OF THE DRAWINGS

Other objects, features, and advantages of the present invention will become apparent upon study of the following detailed description, taking in conjunction with the drawings in which.

DETAILED DESCRIPTION OF THE PREFERRED EMBODIMENT

Figure 1:
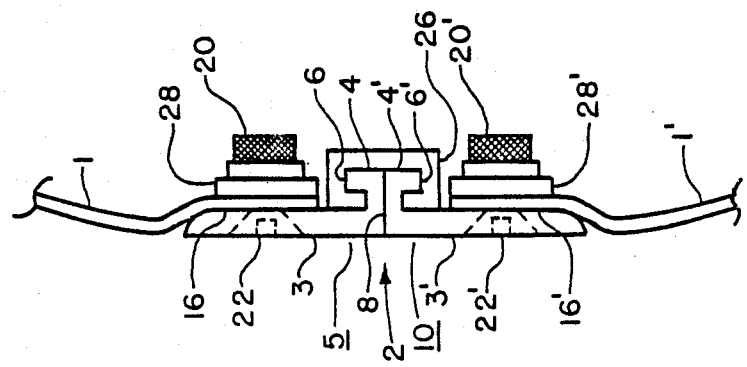
FIG. 1 illustrates an end view of one embodiment of the invention.

As shown in FIG. 1, the aforesaid cylindrical duct has a first terminal portion 1 and a second terminal portion 1'. A first coupling member 5 includes a base portion 3, a rib portion 4 extending away from base portion 3, and a projection portion 6 extending away from rib portion 4. Projection portion 6, together with rib portion 4, form an L-shaped configuration as illustrated. A second coupling member 10, includes a similar base portion 3', rib portion 4', and projection portion 6'. Side portions 8 of each rib portion are shown in contact with each other when slidable clamp 26 has been positioned over the coupling members as illustrated in FIGS. 1 and 2, to thereby couple terminal duct wall portions 1 and 1' together.

Terminal duct portion 1 is firmly, permanently affixed to the right hand surface of base 3 by means of a first coupling means including a bolt 22 having a counter-sunk head. Bolt 22 passes through a hole in the duct, titanium strip 28 is positioned over the duct portion as illustrated, and knurled nut 20, when tightened, places terminal duct portion 1, base 3, and strip portion 28 in compression. An adhesive layer 16 is also utilized to bond the surface of the terminal duct portion 1 to the right hand surface of base portion 3, before the bolt is applied, to further strengthened the resulting joint. In like manner, the second coupling means for coupling the second terminal duct portion 1' to the second coupling member 10 includes bolt 22', nut 20', strip 28', and adhesive layer 16'. Thus the first and second terminal duct portions are permanently affixed to base portions 3 and 3' of the first and second coupling members respectively.

Figure 2:
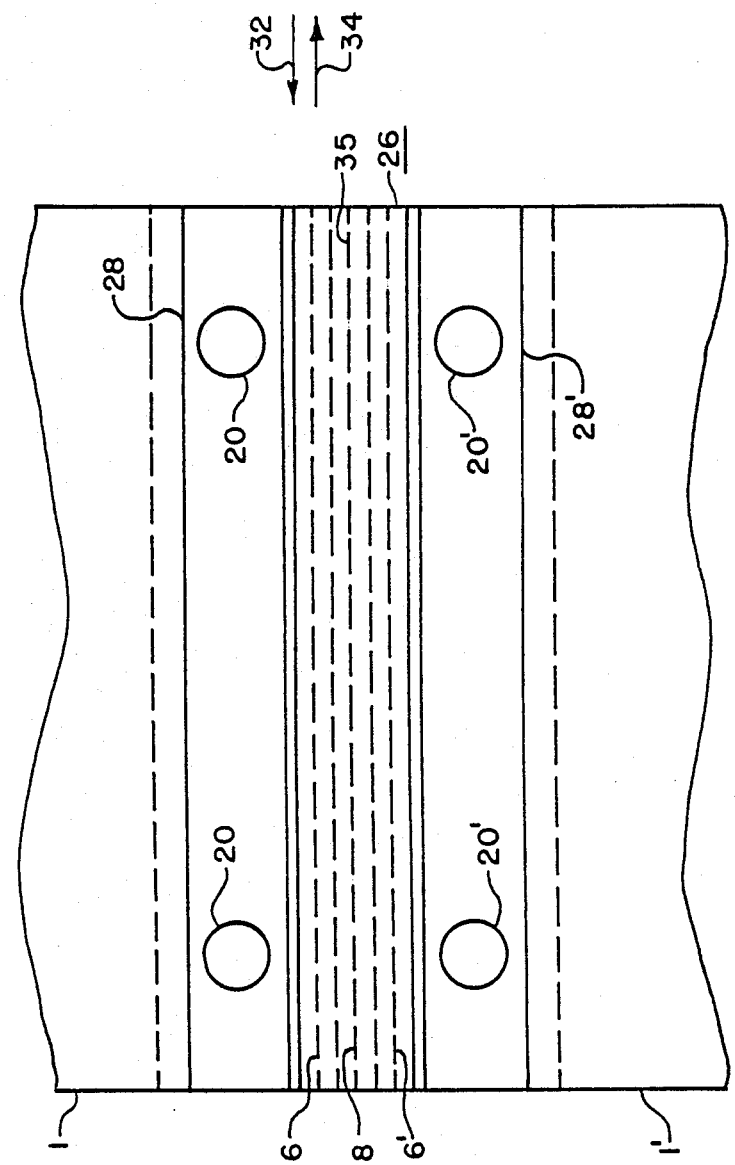
FIG. 2 illustrates a front view of such embodiment.

After side portions 8 of each coupling member are aligned and positioned in contact with each other, elongated clamp member 26, having inner side portions configured to substantially grip and surround each rib and projection portion of the coupling members, is slid over each coupling member in a direction indicated by arrow 32 shown in FIG. 2. Preferably, the slidable clamp 26 comprises a unitary bar, dimensioned to be force-fitted about each coupling member, to cause side portions 8 thereof to be tightly held against each other, to in turn connect the first and second coupling members together.

The aforesaid knurled nuts 20 and 20', strips 28 and 28' and the slidable unitary bar clamp 26, are also illustrated in FIG. 2. It should now be appreciated that end portions of slidable clamp 26 may be rapidly slid over coupling members 5 and 10, to provide a quick connect capability.

Now let it be assumed that the user wishes to disconnect terminal duct portions 1 and 1' from each other to open the duct, to gain access to the engine components contained within the duct. Slidable clamp 26 is now moved in the direction indicated by arrow 34 of FIG. 2, until the elongated clamp 26 is removed from coupling members 5 and 10, to provide separation of the first and second coupling members. Thus the complimentary L-shaped configurations of the slidable clamp 26 and the coupling members form an interlocking arrangement for maintaining firm contact between the side portions 8 of coupling members 5 and 10. The dimensioning of the L-shaped components to provide a force fit of clamp 26 about coupling members 5 and 10, is of course will within the knowledge of the worker in the art. End portions of clamp 26 may be chamfered if desired to faciliate sliding the clamp over members 5 and 10.

Additional retaining members such as spring loaded clamps could, if desired be provided to bear against terminal portions of slidable clamp 26 to further deter unintentional slippage thereof away from coupling members 5 and 10. An elongated rod or similar tool may be passed through the inside of the duct parallel to longitudinal duct axis 35, to displace clamp 26 in the direction of arrow 34 (FIG. 2) to open the duct. Accordingly, direct radial access to the coupler is not needed.

It is also a feature of the invention to cause the terminal portions of the duct segments to be indented as illustrated in FIG. 1, to accommodate the base members 3 and 3' so that they are flush with the outer contour of the duct, and as a result, the outer contour of the cylindrical duct is not disrupted. Also, the interior of the slidable clamp 26 may be described as a T-shaped elongated trough which extends substantially paralled with respect to the longitudinal duct axis 35, illustrated in FIG. 2. It is to be understood that the above described embodiment is merely exemplary, and the scope of the invention is to be restricted only by reasonable interpretation of the language of the following claims, and art recognized equivalents thereof. For example, the complimentary interlocking configurations of the components described need not be L-shaped, but could conceivably have other interlocking configurations. Also, the side portions 8 of the aforesaid ribs need not be in actual contact; a resilient gas gasket or the like may separate them.

What is claimed is:

1. A coupling device for detachably coupling first and second terminal duct portions of a substantially cylindrical duct together along a line substantially parallel with a longitudinal axis of said duct comprising:

a first coupling member having a base portion, a rib portion extending above said base portion, said rib portion having a side portion and a projection portion extending away from said side portion;

a second coupling member having a base portion, a rib portion extending above said base portion, said rib portion having a side portion, and a projection portion extending away from said side portion;

first coupling means for coupling said first terminal duct portion to the base portion of said first coupling member;

second coupling means for coupling said second terminal duct portion to the base portion of said second coupling member;

a clamp member positioned inside said substantially cylindrical duct having inner side portions facing each other, configured to grip each projection portion and each rib portion of said first and second coupling members to clamp said first and second coupling members together, and wherein said duct has an outer contour, and said terminal duct portions are indented to accommodate the base portions of said first and second coupling members without changing the outer coutour of said duct, and wherein said first and second coupling means each comprise at least one bolt for coupling a terminal duct portion to an associated base portion and an adhesive layer for bonding a terminal duct portion to an associated base portions.

* * * * *